US006845430B2

(12) United States Patent
Hopeman et al.

(10) Patent No.: US 6,845,430 B2
(45) Date of Patent: Jan. 18, 2005

(54) SYSTEM FOR MAINTAINING A BUFFER POOL

(75) Inventors: Albert A. Hopeman, Arlington, MA (US); James E. Carey, Brookline, MA (US); Bruce F. Golbus, Waban, MA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 10/452,461

(22) Filed: Jun. 2, 2003

(65) Prior Publication Data

US 2003/0196042 A1 Oct. 16, 2003

Related U.S. Application Data

(63) Continuation of application No. 09/595,667, filed on Jun. 19, 2000, and a division of application No. 09/595,667, filed on Jun. 19, 2000, now Pat. No. 6,574,720, which is a continuation-in-part of application No. 08/866,518, filed on May 30, 1997, now Pat. No. 6,078,994, and a continuation-in-part of application No. 08/866,619, filed on May 30, 1997, now Pat. No. 6,324,623.

(51) Int. Cl.$^7$ .............................................. G06F 12/08
(52) U.S. Cl. ..................... 711/150; 711/133; 707/206
(58) Field of Search ................................ 711/130, 147, 711/150, 170, 159, 133; 707/206

(56) References Cited

U.S. PATENT DOCUMENTS

| | | | |
|---|---|---|---|
| 4,975,833 A | 12/1990 | Jinzaki | |
| 5,179,702 A | 1/1993 | Spix et al. | |
| 5,274,789 A | 12/1993 | Costa et al. | |
| 5,297,269 A | 3/1994 | Donaldson et al. | |
| 5,345,588 A | 9/1994 | Greenwood et al. | |
| 5,394,555 A | 2/1995 | Hunter et al. | |

(List continued on next page.)

FOREIGN PATENT DOCUMENTS

WO    WO 95/25306 A2    9/1995

OTHER PUBLICATIONS

Li, K., "Shared Virtual Memory on Loosely Coupled Multiprocessors," YALEU/DCS/RR—492, Yale University, Department of Computer Science, pp. 1–209, (Sep. 1986).

(List continued on next page.)

Primary Examiner—Kevin L. Ellis
(74) Attorney, Agent, or Firm—Hamilton, Brook, Smith & Reynolds, P.C.

(57) ABSTRACT

In a multi-threaded computing environment, a shared cache system reduces the amount of redundant information stored in memory. A cache memory area provides both global readable data and private writable data to processing threads. A particular processing thread accesses data by first checking its private views of modified data and then its global views of read-only data. Uncached data is read into a cache buffer for global access. If write access is required by the processing thread, the data is copied into a new cache buffer, which is assigned to the processing thread's private view. The particular shared cache system supports generational views of data. The system is particularly useful in on-line analytical processing of multi-dimensional databases. In one embodiment, a dedicated collector reclaims cache memory blocks for the processing threads. By utilizing a dedicated collector thread, any processing penalty encountered during the reclamation process is absorbed by the dedicated collector. Thus the user session threads continue to operate normally, making the reclaiming of cache memory blocks by the dedicated collector task thread transparent to the user session threads. In an alternative embodiment, the process for reclaiming page buffers is distributed amongst user processes sharing the shared memory. Each of the user processes includes a user thread collector for reclaiming a page buffer as needed and multiple user processes can concurrently reclaim page buffers.

40 Claims, 8 Drawing Sheets

U.S. PATENT DOCUMENTS

| | | | |
|---|---|---|---|
| 5,414,840 A | | 5/1995 | Rengarajan et al. |
| 5,430,850 A | | 7/1995 | Papadopoulos et al. |
| 5,459,862 A | | 10/1995 | Garliepp et al. |
| 5,475,858 A | | 12/1995 | Gupta et al. |
| 5,535,116 A | | 7/1996 | Gupta et al. |
| 5,566,315 A | * | 10/1996 | Milillo et al. ............... 711/113 |
| 5,590,326 A | | 12/1996 | Manabe |
| 5,613,086 A | | 3/1997 | Frey et al. |
| 5,636,355 A | * | 6/1997 | Ramakrishnan et al. .... 711/113 |
| 5,642,495 A | | 6/1997 | Ammann et al. |
| 5,684,993 A | | 11/1997 | Willman |
| 5,742,785 A | | 4/1998 | Stone et al. |
| 5,761,670 A | * | 6/1998 | Joy ........................ 707/103 R |
| 5,812,852 A | | 9/1998 | Poulsen et al. |
| 5,822,763 A | | 10/1998 | Baylor et al. |
| 5,829,034 A | | 10/1998 | Hagersten et al. |
| 5,860,101 A | | 1/1999 | Arimilli et al. |
| 5,924,093 A | | 7/1999 | Potter et al. |
| 5,950,228 A | | 9/1999 | Scales et al. |
| 5,958,028 A | | 9/1999 | Bean et al. |
| 6,026,474 A | | 2/2000 | Carter et al. |
| 6,078,994 A | * | 6/2000 | Carey ......................... 711/133 |
| 6,163,806 A | | 12/2000 | Viswanathan |
| 6,167,490 A | | 12/2000 | Levy et al. |
| 6,324,623 B1 | | 11/2001 | Carey |
| 6,574,720 B1 | | 6/2003 | Hopeman et al. |

OTHER PUBLICATIONS

Berson, A., *Client/Server Architecture*, Second Edition, McGraw–Hill Series on Computer Communications, (1996). Chapter 4, "Server Specialization in the Client/Server Environment," pp. 99–131. Chapter 16, "Technology and Advanced Applications of Data Warehousing," pp. 463–501.

Baylor, Sandra J., et al., "An Evaluation of Cache Coherence Protocols for MIN–Based Multiprocessors," International Symposium on Shared Memory Multiprocessing, pp. 230–241 (Tokyo, Japan, Apr., 1991).

* cited by examiner

SYSTEM FOR MAINTAINING A BUFFER POOL

RELATED APPLICATIONS

This application is a Continuation/Divisional of U.S. application Ser. No. 09/595,667 entitled "System for Maintaining Buffer Pool," by Albert A. Hopeman et al. (filed on Jun. 19, 2000) now U.S. Pat. No. 6,574,720, which is a Continuation-in-Part of U.S. application Ser. No. 08/866,518, entitled "System for Maintaining a Shared Cache in a Multi-Threaded Computer Environment," by James E. Carey (filed on May 30, 1997) now U.S. Pat. No. 6,078,994, and U.S. application Ser. No. 08/866,619, entitled "Computing Systems for Implementing A Shared Cache," by James E. Carey (filed on May 30, 1997) now U.S. Pat. No. 6,324,623, the entire teachings of which are incorporated herein by reference.

BACKGROUND

A multi-threaded large scale computer system, such as a database management system ("DBMS"), supports a number of different users concurrently. In a multi-threaded computer system there is only one execution of the software; that is, only one process. From the one process, a user thread is created for each user. All the user threads share the same process memory space, because they are part of the same process.

A cache is a storage area operating between a processor and another, slower storage area (such as a disk). Although, other schemes may exist, typical cache memory is evenly divided into a fixed number of finitely sized cache memory blocks, called a page. The cached data includes pages which have stored therein currently executing instructions and currently referenced data. The page stored in each cache memory block is typically controlled and managed through control blocks, there being a correspondence between a control block and a cache memory block. If a user thread references an instruction or data not in memory; then a page fault occurs, which causes the relevant page to be read from disk into the cache. Such an arrangement is typical of cache memory. Problems occur when more pages need to be cached than there are available cache blocks in the cache requiring reclamation of pages.

SUMMARY

In accordance with a particular embodiment of the invention, a public memory structure is utilized to store data that is shareable between a plurality of users in a multi-threaded computing environment. In contrast to the prior art, a cache memory area on a server is used to store public, shareable data and private, non-shareable data without using locks to negotiate resource ownership. Consequently, there are public and private pages stored in global memory. The private pages are those that are modifiable by a user and the public pages are those that are only readable by one or more users.

One aspect of the invention is to manage memory on a computer. From the memory there are a plurality of cache memory blocks cooperatively shared by processing threads executing on the computer. These processing threads include user sessions and resource managers.

The user threads consume page data stored on the cache memory blocks. Each user thread has a public view of unmodified cached pages and can have modified cached pages in a private view. During on-line analytical processing (OLAP), the user threads process the cached pages. For pages that are only read by the user thread, the public view is used to access the necessary cache memory block, which may be read by multiple users. When an analysis requires modifying data, however, access through a public view is inappropriate. Instead, the cache memory block pointed to by the public view is copied to a new cache memory block. The user thread is then assigned a private pointer to the copied pages, and can modify the data in this private view without affecting data viewed by other threads.

The resource managers ensure that the user threads cooperate to function effectively. In particular, a paging manager interfaces the user threads with the cache memory space to retrieve pages from disk.

In accordance with one embodiment of the invention, a computer-implemented program manages memory in a computer having a plurality of memory blocks. These memory blocks can be a cache memory area. Data is stored in memory blocks, including a first memory block and a second memory block. First and second user sessions or user threads execute in the computer, with the first user session having a global view of the first memory block data and the second user session having a global view of the first memory block data and a private view of the second memory block data. In particular, the first and second user sessions are threads in a multi-threaded computer system.

The user threads can execute resource manager instructions to map data stored in a cache memory block with a location of the cache memory block in the computer. The resource manager also transfers data from a database into a cache memory block and stores generational views of the data. In particular, the data is retrieved from a multi-dimensional database.

A particular method facilitates simultaneous analysis of data in multiple sessions in a computer. First, data is retrieved from storage into public blocks of a shared memory space. These public blocks store data for global read access by a plurality of user sessions. Second, public blocks of data are selectively copied into private blocks of the shared memory space. Each private block stores data for private read and write access by a single user session. Upon read access to a data item by a user session, the data item is read if present from a private block accessible by the user session. If the data item is not present on a private block accessible by the user session, the data item is read from a public block. Upon write access to a data item by the user session, the data item is written to a private block if present in a private block accessible by the user session. If the private block is not already present, then data is copied from a public to a private block for access by the user session.

A dedicated collector task can be used to reclaim memory blocks. A list of free memory blocks is stored in the computer. A triggering event is generated based on the amount of free memory blocks in the free list. The triggering event triggers a dedicated collector to reclaim memory blocks to the free list.

The user sessions and the dedicated collector task can be implemented as processing threads in a multi-threaded computing system. In particular, the computing system can include a plurality of processing units for executing the threads. However, aspects of the invention can also be applied to processes in a multi-process architecture. As such, the term data accessor will be understood to encompass any computing mechanism to access or manipulate data, including threads and processes. By utilizing a dedicated collector thread, any processing penalty encountered during the reclamation process is absorbed by the collector thread. Thus the user session threads continue to operate normally, making the reclaiming of cache memory blocks by the dedicated collector task thread transparent to the user session threads.

As the number of user session threads concurrently executing in the system increases however, the number of allocatable cache memory blocks stored on the free list decreases. The use of a single dedicated collector task thread can reduce performance of the system because, after requesting a memory block, if the free list is empty, a user session thread must wait until the single dedicated collector task thread reclaims a memory block and stores it on the free list. Also, deadlock can occur if there are no memory blocks on the free list. For example, the single dedicated collector task thread could be waiting for a user session thread to complete after calling the user session thread to perform an action for the single dedicated collector task thread and the user session thread could be waiting for the single dedicated collector task thread to add a memory block to the free list. There is consequently a need for an alternative method for collecting memory blocks for use by multiple user session threads in a multi-threaded computer system.

In particular, the user thread collector can be a routine executed in the user thread. The collector searches shared memory for a collectable block by, for example, randomly selecting an index to a block in shared memory and determining if the selected block is collectable. Upon determining that a previously selected block is not collectable, the user thread collector can successively select a next index to search and determine if the selected next block is collectable. The next index may be selected by incrementing the previously selected index. The actions of selecting and determining can be repeated until a collectable block is found.

By allowing each user thread collector to request reclamation of a block for use by the user thread, the user thread does not have to wait for a single dedicated collector thread to reclaim a block. Thus, potential deadlock is avoided. Also, with each user thread collector in a user thread responsible for reclamation of blocks, by randomly selecting an index to a block in shared memory, avoids potential deadlock and the need for a free list of blocks and the associated logic for controlling the free list is no longer required, reducing the memory required in the computer system.

BRIEF DESCRIPTION OF THE DRAWINGS

The foregoing and other objects, features and advantages of the system for maintaining a buffer pool will be apparent from the following more particular description of particular embodiments, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
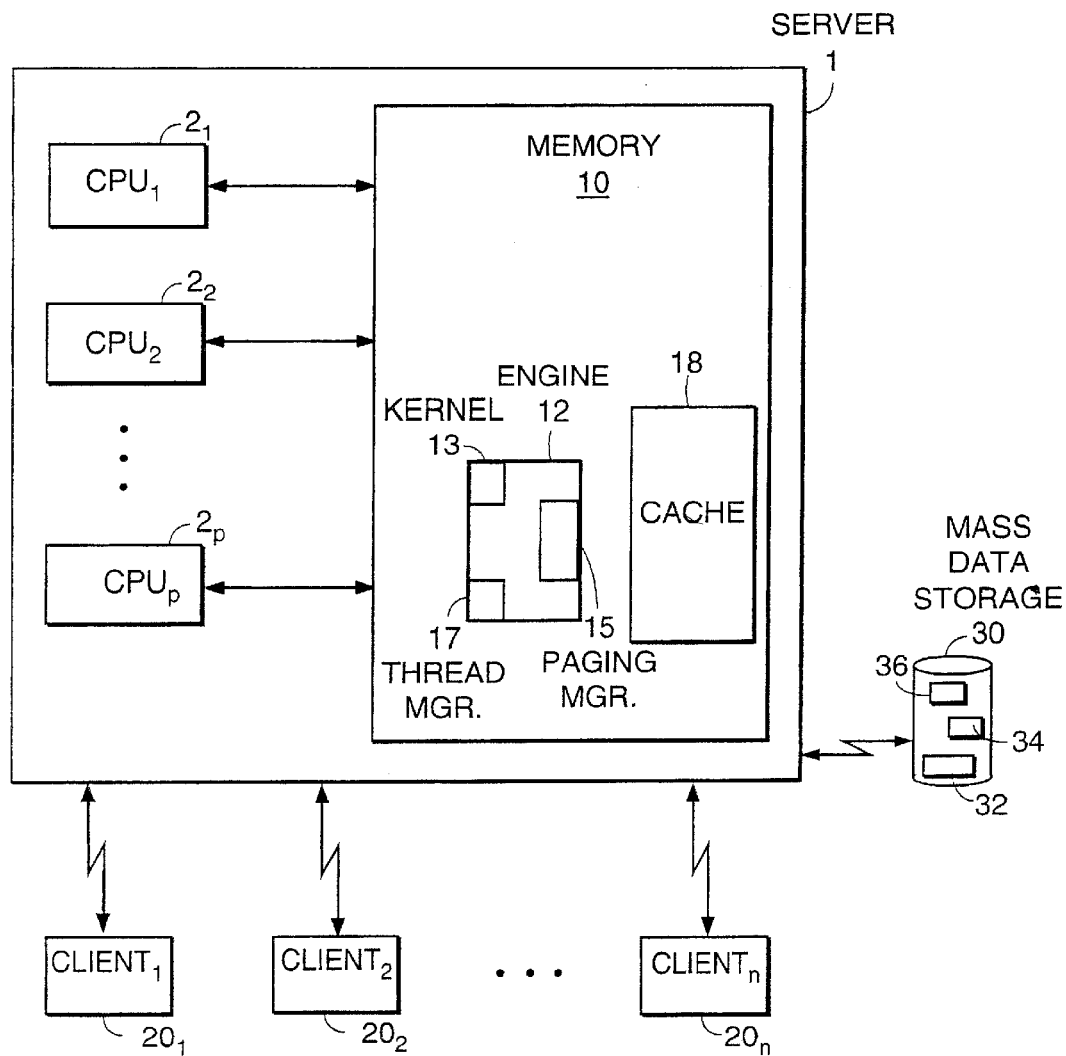
FIG. 1 is a schematic block diagram of an on-line analytical processing system embodying the invention.

FIG. 1 is a schematic block diagram of an on-line analytic processing (OLAP) system embodying the invention. A server 1 responds to requests from a plurality of client users $20_1, 20_2, \ldots, 20_n$. To satisfy client requests, the server 1 retrieves data from a data storage warehouse 30, which can include various databases, such as relational databases 32, multi-dimensional databases 34 and temporary databases 36 stored on disk.

The server 1 includes at least one central processing unit (CPU) $2_1, 2_2, \ldots, 2_p$. The CPUs 2 execute client or user sessions and system management processes to operate on data stored in memory 10, which includes an OLAP engine 12 and a cache memory 18. The OLAP engine 12 includes a kernel 13, a paging manager 15 and a thread manager 17. The user sessions can execute paging manager instructions, including page transfer functions (not shown), to manage pages in memory 10.

The user sessions and system management processes can include processing threads managed by the thread manager 17 in a multi-threaded OLAP engine 12. That is, user sessions can accomplish tasks by asynchronously executing processing threads. Embodiments of the system take the form of computer executable instructions embedded in a computer-readable format on a CD-ROM, floppy or hard disk, or another computer-readable distribution medium. These instructions are executed by one or more CPUs $2_1, 2_2, \ldots, 2_p$ to implement the OLAP engine 12.

Figure 2:
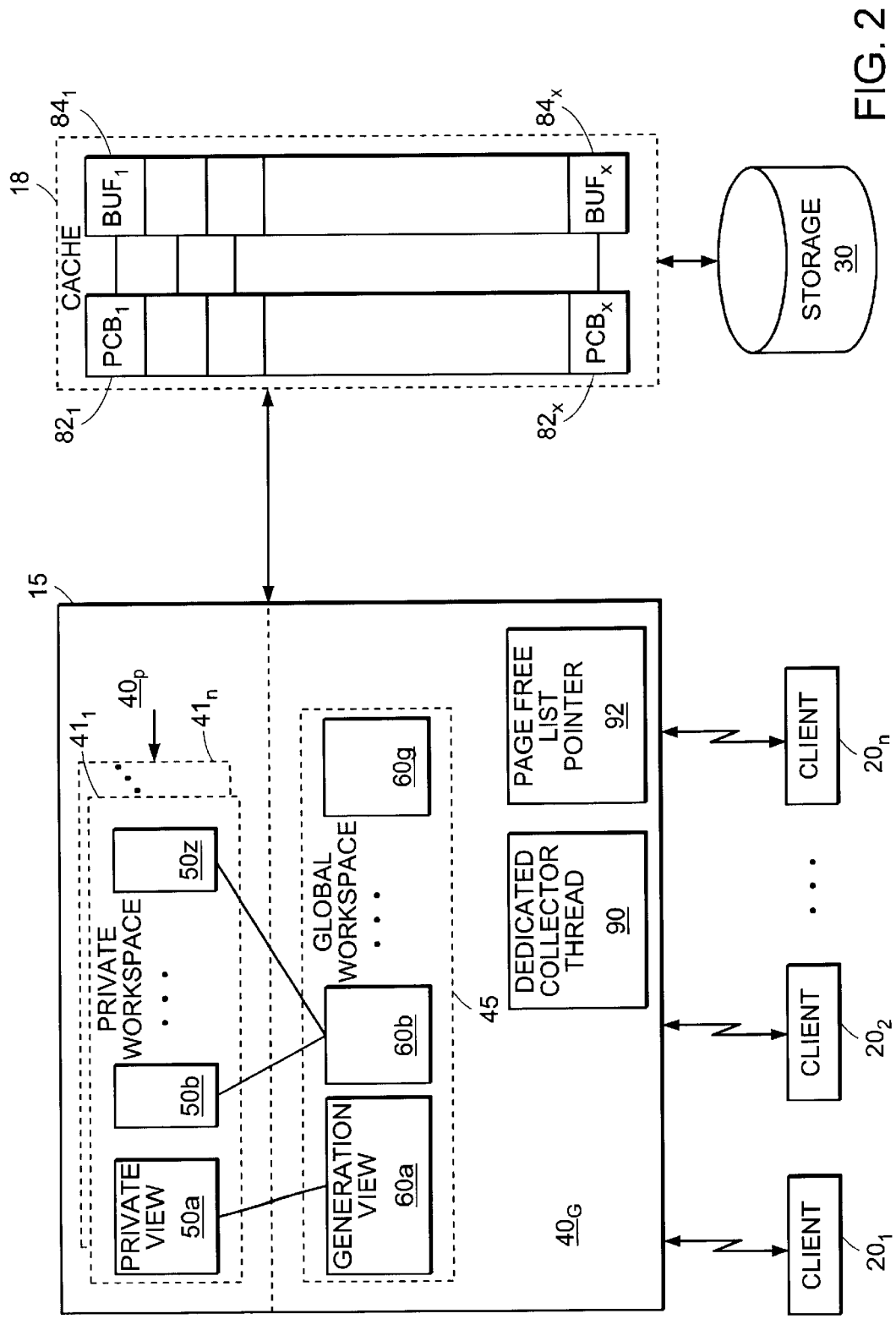
FIG. 2 is a schematic block diagram of a page management system with a dedicated collector thread.

FIG. 2 is a schematic block diagram of a page management system shown in FIG. 1. The paging manager 15 receives page requests from the client users $20_1, 20_2, \ldots, 20_n$ and insures that current pages are retrieved from disk 30 and stored in the shared cache memory 18. The cache memory 18 can be global memory or memory assigned to an on-line analytical processing ("OLAP") application by a server operating system.

The paging manager 15 includes a private memory section $40_P$ and a public memory section $40_G$. The private section $40_P$ can include a plurality of private workspaces $4_1, 41_2, \ldots, 41_n$. There is one private workspace 41 for each user session. A private workspace 41 includes private pagespace views $50_a, 50_b, \ldots, 50_z$, which record information about writable pagespaces referenced by the current user session.

The public section $40_G$ is organized based on open databases. For ease of understanding, the system is illustrated as having one open database. However, it should be understood that there are generally a plurality of open databases being accessed by the client users. For each open database there is a public workspace 45 in the public memory section $40_G$ having, in general, a plurality of generational pagespace views $60_a, 60_b, \ldots, 60_g$. Each private pagespace view 50 is associated with a particular generation of the database. For ease of description, embodiments of the system will be described with reference to a single database having a single generation in memory.

The cache memory 18 includes page buffers $84_1, 84_2, \ldots, 84_x$ each having an associated page control block ("PCB") $82_1, 82_2, \ldots, 82_x$. Each free page buffer 84 holds a page of data read from storage 30. In accordance with a particular embodiment, the free page buffers 84 each store data in blocks of 4K bytes, defined as a page. It should be understood that the page size can be chosen to be either less than or greater than 4K bytes. A page control block 82 includes data fields used to control and access the associated page buffer 84. The cache memory 18 is shared by the user sessions to store both public and private data.

It is important to note that there is no physical division between public and private data pages. That is, a particular free page buffer 84 simply stores a page of data, which can be either public or private data. The public workspace 45 and the private workspaces $41_1, \ldots, 41_n$ include indexes to the appropriate page control blocks $82_1, \ldots, 82_x$.

As discussed above, pages retrieved from disk 30 are stored into a page buffer 84. To facilitate this function, the paging manager 15 maintains a list of all page buffers 84. For example, a free list pointer 92 can point to a linked list of page control blocks 82 associated with free page buffers 84. When the paging manager 15 needs a free buffer, the first page control block on the free list is popped from the top of the linked list, moving the free list pointer to the next page control block in the linked list.

In accordance with one embodiment, the user sessions do not directly maintain the cache memory area. Because of the particular use of pagespaces and pointers to denote page ownership, a user session requiring a new page may deadlock with another user session. In such a situation, each user session can be referencing a page that the other user session has chosen to swap from memory. To avoid such a deadlock, a separate dedicated collector thread 90 can be utilized to manage page removal from the cache memory area.

To minimize processing delays which can occur when the free list becomes empty, the paging manager 15 maintains a counter of the number of entries on the free list. Every time a page control block is removed from the free list, the count in compared with a minimum threshold value. If the minimum threshold is met, then the paging manager begins a collecting operation through the dedicated collector thread 90 to free up additional page buffers. The minimum threshold value can be chosen based on a historical operational profile of the system to maximize the number of page buffers 84 in use while reducing the chances that there are no free page buffers at any time. For example, the minimum threshold value can be initially chosen to be 10% of the total page buffers. The minimum threshold can also be dynamically adjusted by the paging manager 15 over time.

Figure 3:
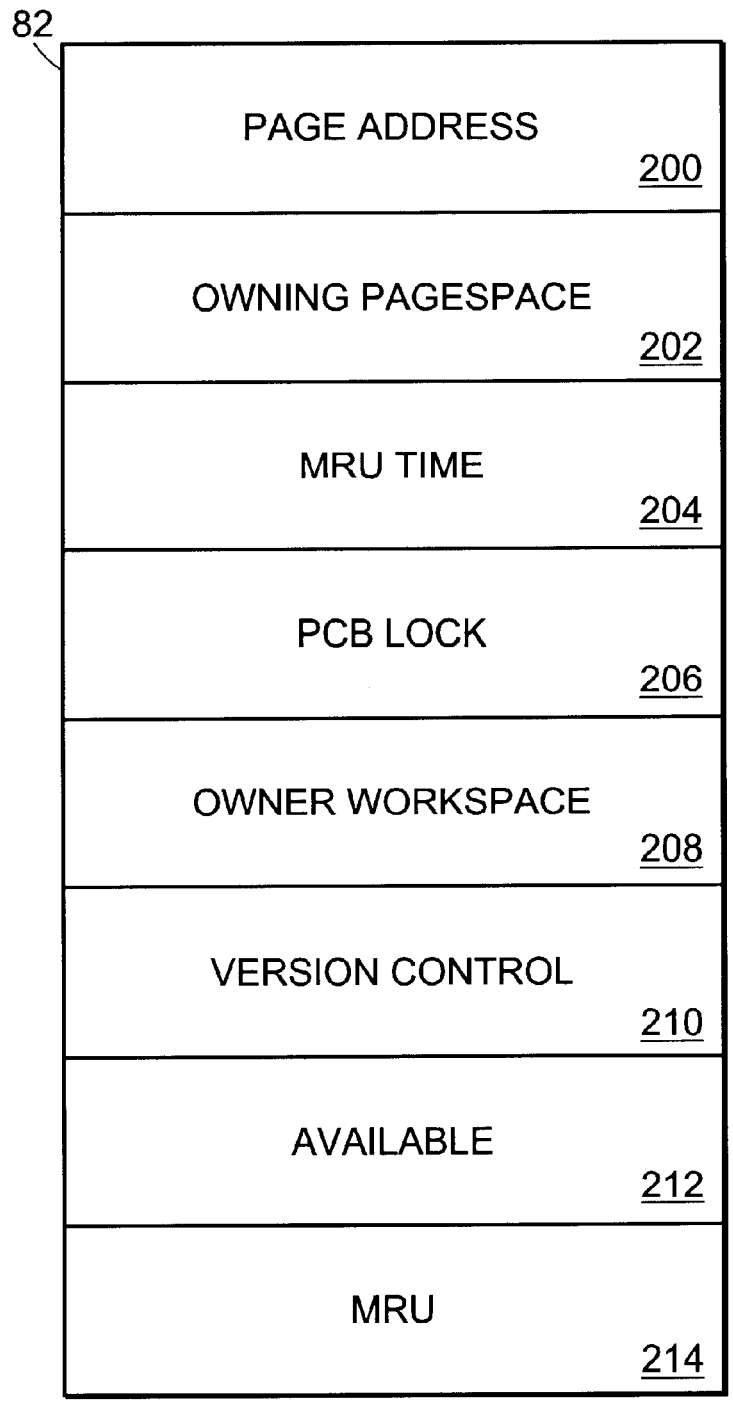
FIG. 3 illustrates one of the page control blocks used in the embodiments shown in FIG. 1 and FIG. 5.

FIG. 3 illustrates one of the page control blocks 82 shown in FIG. 2. The page control block 82 is a control structure stored in cache 18 (FIG. 2). The page control block 82 includes fields which are used to manage the page buffers 84 in the cache 18. The page control block 82 includes the following fields: a page address 200, an owning page space 202, a Most Recently Used ("MRU") time field 204, a PCB lock 206, an owner workspace field 208, a version control field 210, an available field 212 and an MRU field 214.

The page address field 200 stores the location of the associated page buffer 84 in cache 18. The owning page space field 202 identifies whether the page buffer 84 is local or global. A timestamp is stored in the MRU time field 204 every time the page buffer 84 associated with the page control block 82 is accessed. The PCB lock 206 is generally obtained before fields in the page control block 82 are modified. The owner workspace field 208 stores the address of the owning workspace. The version control field 210 stores the version of the page control block 82. The available field 212 is a one-bit wide status field, the state of which indicates whether the page buffer 84 associated with the page control block 82 is available for use. The MRU field 214 is one bit wide, the state of which indicates whether the page buffer 84 associated with the page control block 82 is on an MRU list.

Figure 4A:
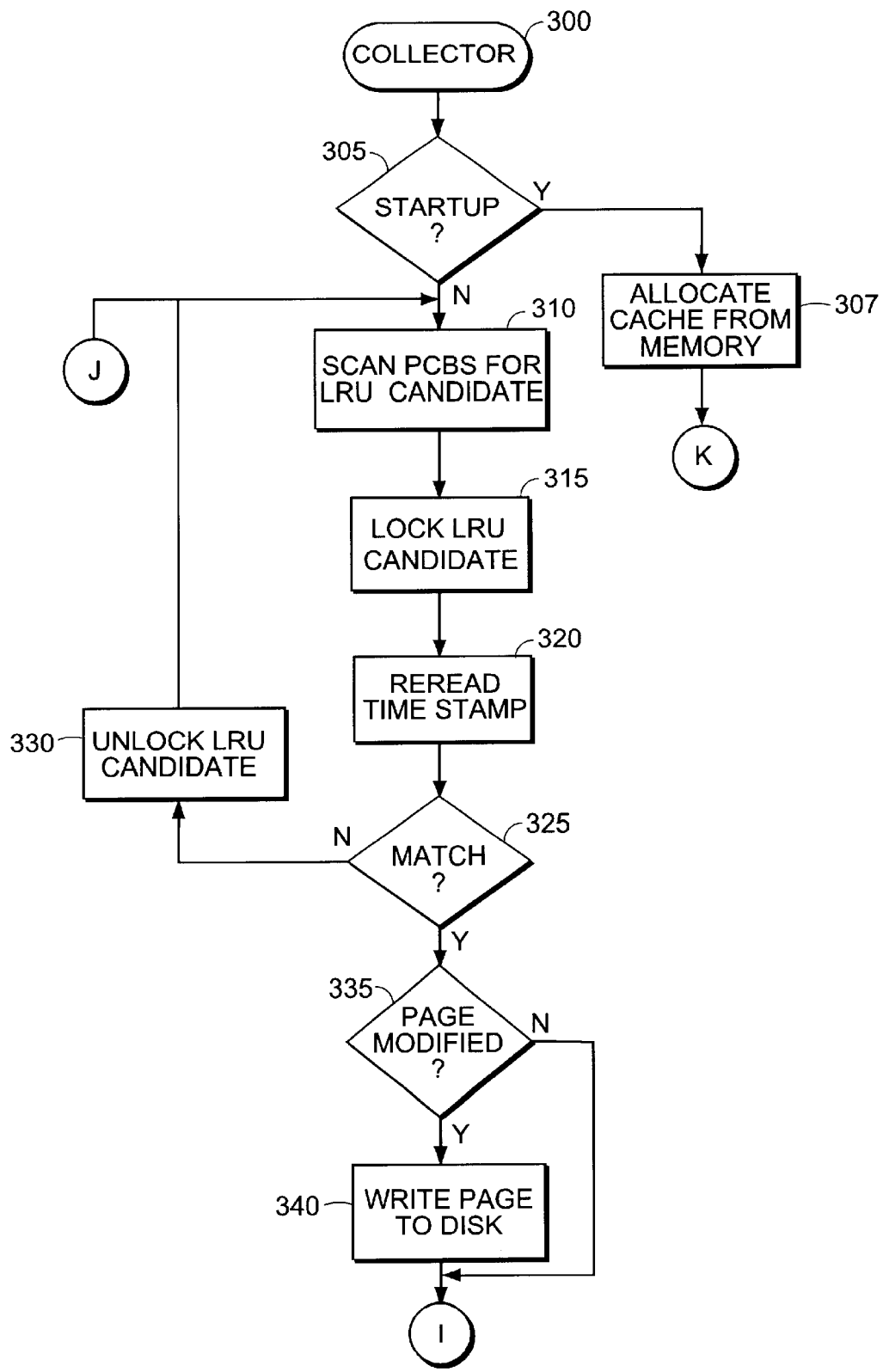
FIGS. 4A–4B illustrate a flow chart of a collector operation in accordance with the embodiment of the invention with a shared collector shown in FIG. 2.
Figure 4B:
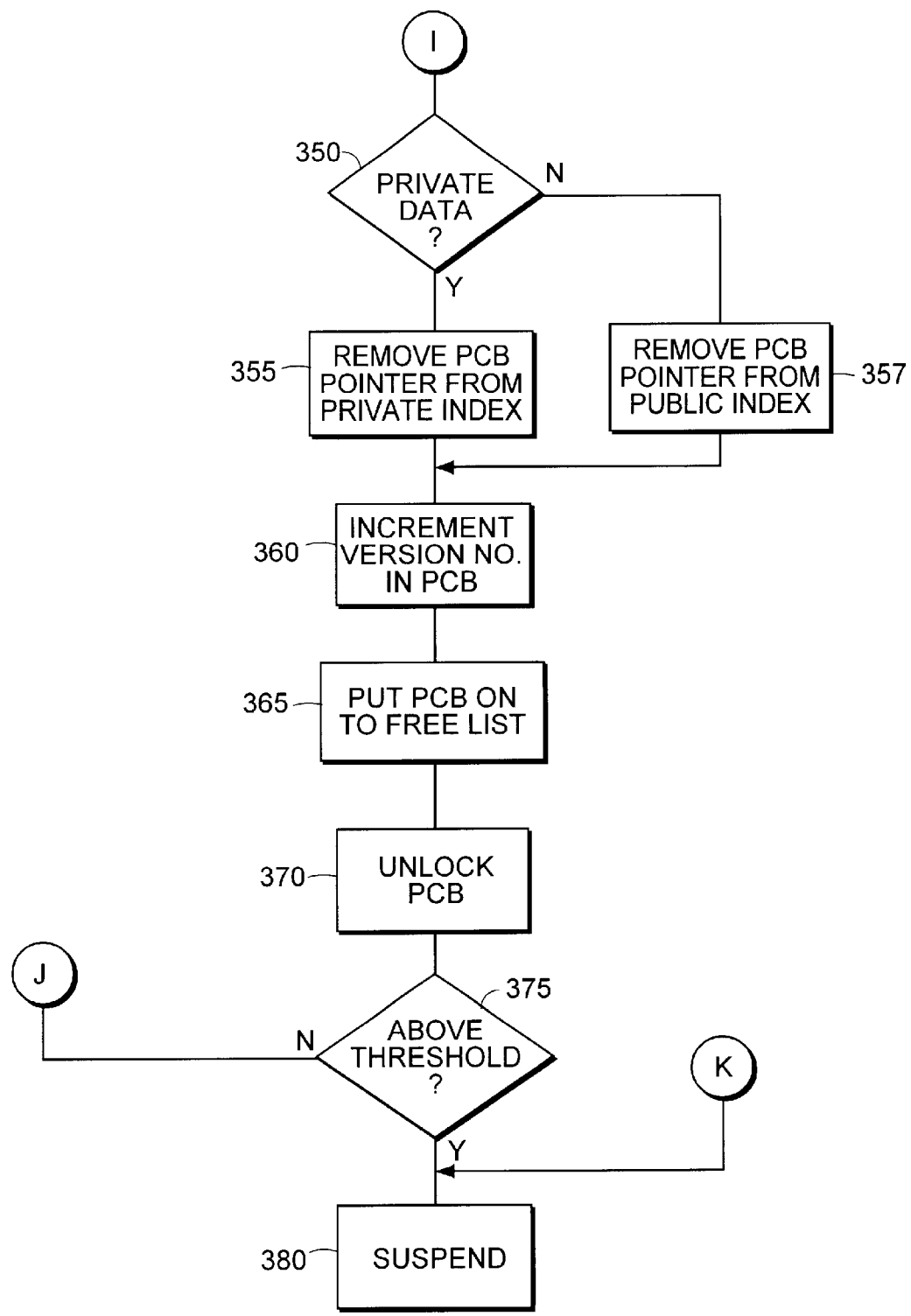

FIGS. 4A–4B illustrate a flow chart of a collecting operation 300 in accordance with an embodiment with a dedicated collector thread 90, as shown in FIG. 2. The collector operation 300 is performed by a specialized dedicated collector thread 90 in a multi-threaded environment. At step 305, the operation checks the startup condition. If a startup condition exists, then processing continues to step 307 where the dedicated collector thread 90 allocates cache memory from main memory. Processing then jumps to step 380.

If this is not a startup condition, processing continues to step 310. At step 310, the dedicated collector thread 90 scans the page control blocks ("PCBs") for the least-recently-used (LRU) candidate. In particular, the dedicated collector thread 90 reads the MRU time field 204 from each page control block $82_1, 82_2, \ldots, 82_x$. The page control block having the earliest MRU time, is the LRU candidate. At step 315, the dedicated collector thread 90 locks the LRU candidate, thereby setting the PCB lock 206 in the page control block 82. At step 320, the dedicated collector thread 90 rereads the MRU time field 204 from the LRU candidate page control block. At step 325, the dedicated collector thread 90 compares the original time value with the reread time value to verify that the page has not been more recently used.

If the compared time values do not match, then processing continues to step 330. At step 330, the dedicated collector thread 90 unlocks the LRU candidate page control block and processing returns to step 310 to try again.

If the time values agree (step 325), then the page is confirmed as the least-recently-used page and processing continues to step 335. At step 335, the owning pagespace field 202 of the page control block 82 is checked. If the owning pagespace field 202 is set, then the page is private data to the user session identified by the owner workspace field 208 and processing continues to step 340. At step 340, the dedicated collector thread 90 causes the page buffer to be written to disk, such as an extended database 36. In particular, if an extension file needs to be created, the dedicated collector thread 90 sends a message to the owner user session to do the file creation. Once the extension file exists, the dedicated collector thread 90 writes to it itself. Processing then continues to step 350. If the data has not been modified (as indicated by a null (i.e., public) owning pagespace field 202), then the data is public data for read-only access. In that case, processing jumps to step 350 without rewriting the data to disk.

At step 350, a check of the owning pagespace field 202 is again made to see if the field is not null (i.e., private data). If the page is private, processing continues to step 355, where the page control block pointer is removed from the private index structure (not shown) by setting the private pointer (not shown) to null. If the page is public, processing instead continues to step 357 where the page control block pointer is removed from the public index structure (not shown) by setting the public pointer (not shown) to null.

At step 360, the version number of the page stored in the version control field 210 in the page control block 82 is incremented. At step 365, the page control block is put onto a free list of available page control blocks. At step 370 the page control block is unlocked to make it available for re-use.

At step 375, the dedicated collector thread 90 tests the number of page control blocks on the free list. If this number is above a preset maximum threshold, then processing continues to step 380. If the maximum threshold has not yet been reached, processing returns to step 310 to search for additional page control blocks to add to the free list. The maximum threshold value can be chosen to optimize the cache memory 18 based on past performances. For example, the maximum threshold can initially be twice the minimum threshold and can be dynamically adjusted by the paging manager.

At step 380, the dedicated collector thread 90 suspends itself. It is awakened again when the number of page control blocks 82 on the free list is reduced to be below the previously-described minimum threshold level. The dedicated collector thread 90 can be awakened by a write or read operation from a user session when a page buffer is taken from the free list. Although the triggering event may be generated by a user session, it can be generated at the system level.

Although the dedicated collector thread 90 has been described as employing an LRU algorithm, other algorithms may be more particularly suitable. For example, in systems having large caches, the computations required to determine the LRU candidate can be very time consuming. It should be recognized, however, that the function of the dedicated collector thread 90 is to maintain a buffer of free page slots, even during heavy page faulting, without blocking user threads. To accomplish this function, it is recognized that the candidate page slot does not have to be storing the LRU page.

In accordance with another preferred embodiment, an "old enough" algorithm is employed to find a reclamation candidate that has not been recently used. Instead of the MRU time field 204, the dedicated collector thread 90 can be read an internal counter field in the page control block 82, which can be faster to retrieve than a time field. By, for example, knowing the oldest counter value, the dedicated collector thread 90 can determine a threshold counter value for those pages that are old enough to be reclaimed. Instead of looping through the entire page pool for the single LRU candidate, the dedicated collector thread 90 can stop the search when finding the first page having a counter which exceeds the threshold; with the realization that this page is likely to be eventually reclaimed under the LRU algorithm anyway. By using such an "old enough" algorithm, the amount of CPU time required by the dedicated collector thread 90 can be reduced to a few percent of that required for the LRU algorithm.

In an OLAP system, most data retrieved from storage is read-only data, which is easier to remove from the cache memory than modified data. Any session, however, can cause data in the cache memory to be privately modified. This data may only be used for a relatively brief period of time, but may tend to stay in the cache memory, using the server's page buffers for a private function. Although that situation is acceptable for short time periods, if left unattended much of the cache memory blocks can be allocated as private memory.

As the number of user session threads concurrently executing in the system increases however, the number of allocatable cache memory blocks stored on the free list decreases. The use of a single dedicated collector thread 90 can reduce performance of the system because, after requesting a memory block, if the free list is empty, a user session thread must wait until the single dedicated collector thread 90 reclaims a memory block and stores it on the free list. To improve performance, the collector function can be distributed amongst the user threads.

Figure 5:
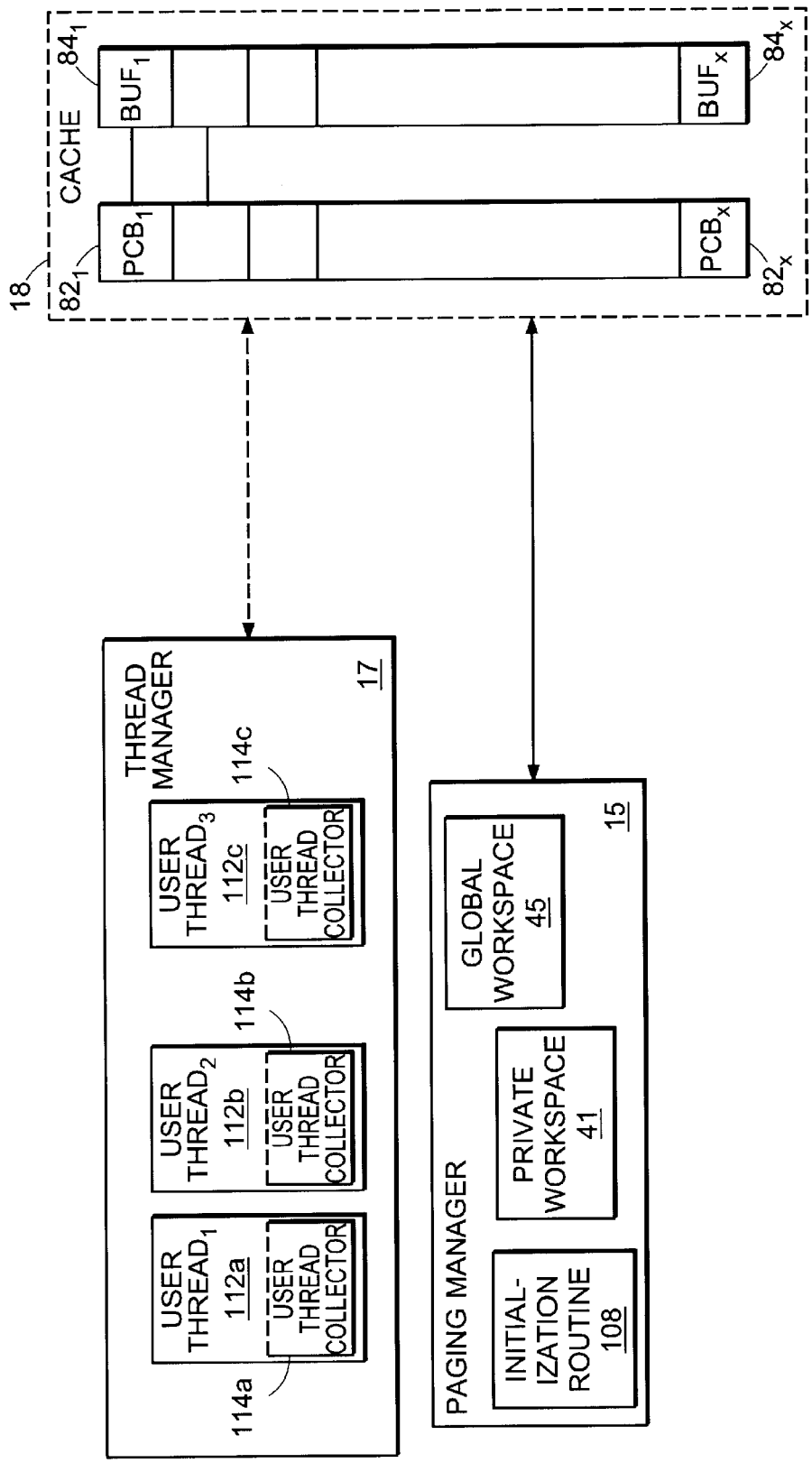
FIG. 5 illustrates a plurality of user threads executing in a memory in a computer system with each user thread having a respective user thread collector.

FIG. 5 illustrates another embodiment of the page management system shown in FIG. 1. The dedicated collector thread 90 in the embodiment described in conjunction with FIG. 2 is replaced by a plurality of user thread collectors 114a–c. A plurality of user threads 112a–c execute in the thread manager 17, with each user thread 112a–c having a respective user thread collector 114a–c. The page management system also includes a cache 18 and a paging manager 15.

The cache 18 includes a plurality of page buffers 84 and a plurality of page control blocks ("PCB"s) 82, with each page buffer 84 having an associated page control block 82. The paging manager 15 includes an initialization routine 108 and a private workspace 41 and global or public workspace 45. The private workspace 41 and global workspace 45 have been described earlier in conjunction with FIG. 2.

The initialization routine 108 in the paging manager 106 allocates page buffers 84 in cache 102 and initializes the page control blocks 82 associated with each page buffer 84. Before any of the user threads 112a–c execute in database management system 100, all the page buffers 84 are free and thus are not assigned to any of the user threads 112a–c. Executing user threads 112a–c request page buffers 84 from the cache 18.

The respective user thread collector 114a–c in the user thread 112a–c searches the page control blocks 82 in the cache 18 for a free page buffer. If no free page buffer is available, the respective user thread collector 114a–c searches for a Least Recently Used ("LRU") page buffer 84. Upon finding a LRU page buffer 84, the user thread collector 114a–c obtains the page buffer 84 for the user thread 112a–c.

Figure 6:
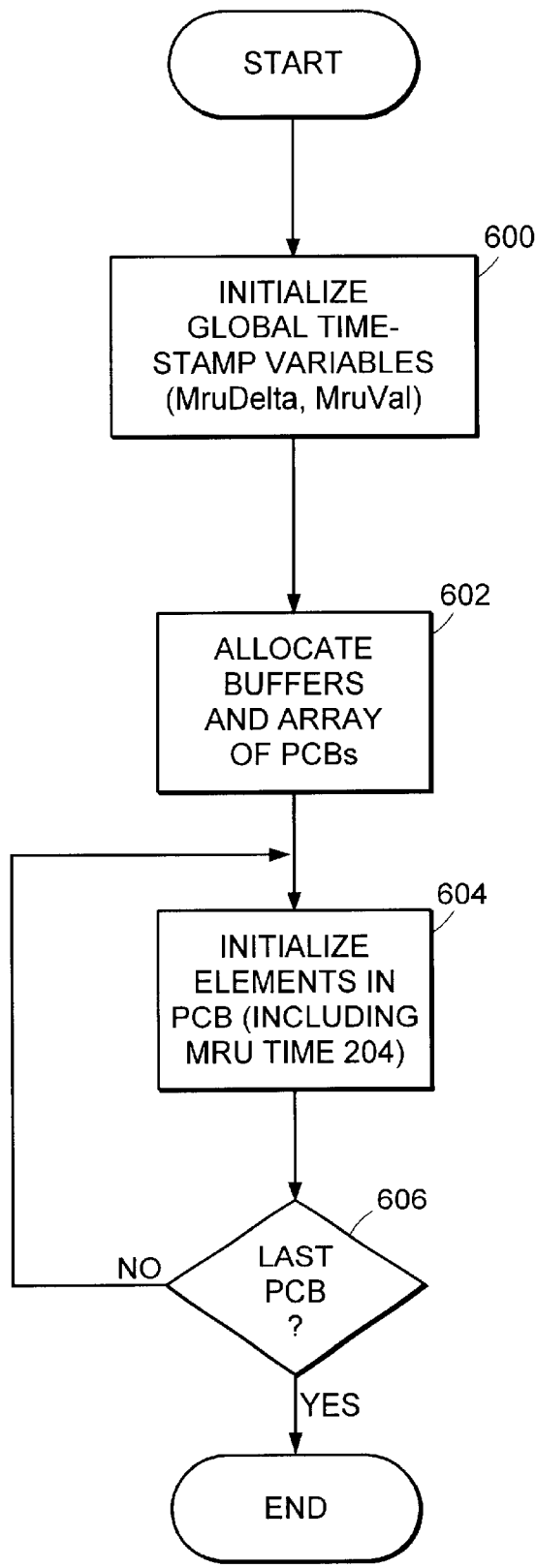
FIG. 6 is a flow diagram of the steps implemented in the initialization routine shown in FIG. 5.

FIG. 6 is a flow diagram of the steps implemented in the initialization routine shown in FIG. 5. The flow diagram is described in conjunction with FIG. 1 and FIG. 5.

At step 600, the initialization routine 108 initializes global variables shared by all the user thread collectors 114a–c. The global timestamp variables include(not shown) and mrudelta (not shown). The global timestamp variables are stored in the global workspace 45 (FIG. 5). The value stored in Mrudelta is dependent on the maximum number of page buffers. Mrudelta is the interval at which the mruval is incremented.

Mruval is initialized with a value equal to the maximum number of page buffers 84 divided by 256. An mrucount count variable is used to calculate the next value for mruval. The mrucount is a variable used to determine the mruval. Mrucount is initialized to 0 and reset to 0 after it reaches 255. If mrucount is less than 255, the current value stored in mruval and mrucount is incremented. Processing continues with step 602.

At step 602, the initialization routine 108 allocates page buffers 84 and associated page control blocks 82. The page buffers 84 are used by the user threads 112a–c. Processing continues with step 604.

At step 604, the initialization routine 108 initializes the MRU time field 204 in each page control block 82 by setting the MRU time field 204 to the current value of mruval. Processing continues with step 606.

At step 606, the initialization routine 108 determines if the last page control block 82 has been initialized. If so, processing is complete. If not, processing continues with step 604.

Figure 7:
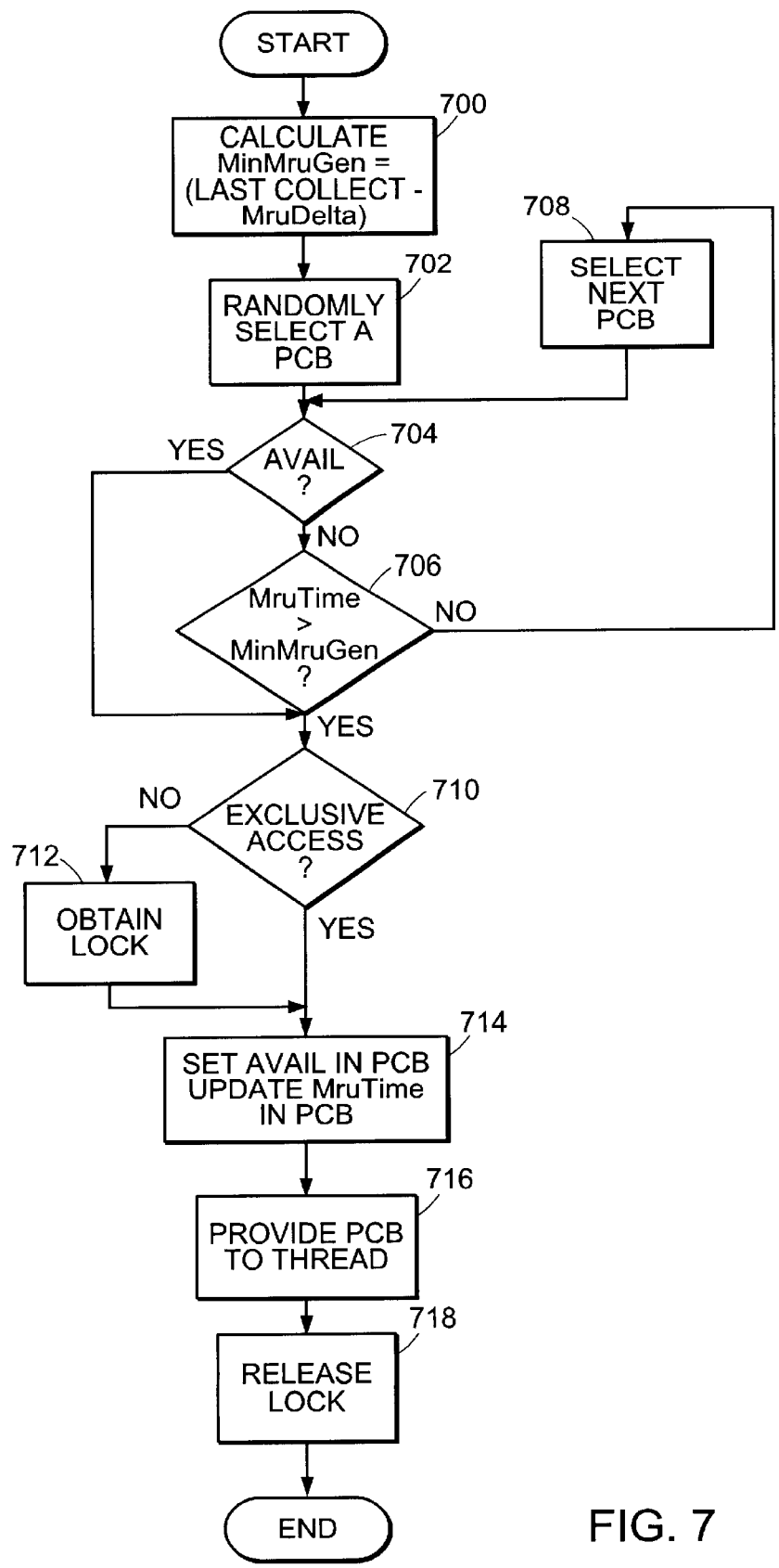
FIG. 7 is a flow diagram of the steps to get a page buffer for a user thread implemented in one of the collectors shown in FIG. 4.

FIG. 7 is a flow diagram of the steps for obtaining a page buffer 84 implemented in each of the user thread collectors 114a–c shown in FIG. 5. The flow diagram is described in conjunction with FIG. 3 and FIG. 5. A user thread 112a–c requests a page buffer 84 by calling its respective user thread collector 114a–c. Each user thread collector 114a–c has a local variable called lastcollect (not shown). Lastcollect stores the mruval calculated after the last collection performed by the user thread collector 114a–c. The value stored in lastcollect is used to determine if a PCB is collectable.

At step 700, a search mechanism in the user thread collector 11 4a–c calculates a MinMRUGen value for the user thread collector 114a–c in the user thread 112a–c. The MinMRUGen value is calculated by subtracting the value stored in the global variable Mrudelta from the value stored in the local variable lastcollect. The calculated MinMRUGen value is used to determine which of the page buffers 84 may be reassigned to a user thread 112a–c. Processing continues with step 702.

At step 702, a randomizer in the search mechanism in the user thread collector 114a–c randomly selects a page control block 82 from the array of page control blocks. The randomizer randomly selects an index for the array. The index is selected from the set of numbers 1 through the maximum number (x) of page control blocks 82 in the array of page control blocks 84. After selecting a page control block 82 the user thread collector 114a–c may obtain exclusive access to the page buffer associated with the page control block 82 at the selected index by getting the PCB lock 206 in the page control block 82. Processing continues with step 704.

At step 704, a determiner in the search mechanism in the user thread collector 114a–c examines the available field 212 in the selected page control block 82. The state of the available field 212 indicates whether the selected page control block 82 is free and can be assigned to the requesting user thread 112a–c. If the determiner determines from the state of the available field 212 that the selected page control block 82 is free, processing continues with step 706. If not, processing continues with step 706.

At step 706, the determiner in the search mechanism in the user thread collector 114a–c examines the MRU time field 204 in the selected page control block 82. If the value stored in the MRU time field 204 is greater than the calculated MinMruGen value, processing continues with step 710. If not, processing continues with step 708.

At step 708, a sequencer in the search mechanism in the user thread collector 114a–c selects another page control block 82. The sequencer selects the next page control block 82 by incrementing the PCB array index. The selection of the next page control block 82 is not limited to incrementing the PCB array index, the next page control block 82 may also be selected by decrementing the page control block array index or by randomly selecting another array index. Processing continues with step 704.

At step 710, the determiner in the user thread collector 114a–c determines if it has exclusive access to the selected page control block 82. If so, processing continues with step 714. If not, processing continues with step 712.

At step 712, the PCB lock 206 in the page control block 82 is obtained so that the user thread collector 114 has exclusive access to the selected page control block 82. Processing continues with step 714.

At step 714, an action mechanism in the user thread collector 114a–c collects the block for use by the user thread 112. To collect the block, the action mechanism modifies the contents of the selected page control block 82 before providing the page control block 82 to the user thread 112a–c. The action mechanism modifies the available field 212 to indicate that the page control block 82 is no longer available, stores the mruval in the MRU time field 204 and in lastcollect. Processing continues with step 714.

At step 716, the action mechanism provides the modified selected page control block 82 to the requesting user thread collector 114a–c. Processing continues with step 718.

At step 718, the action mechanism releases the lock. Processing is complete.

By randomly selecting a page control block 82 in the PCB array, multiple user thread collectors 114a–c may obtain page control blocks 82 for user threads 112a–c in parallel, thus increasing the speed at which a page control block 82 can be obtained. As each user thread collector 114a–c checks first to see if the selected page control block is free by examining the available field 212, no free list is required thereby reducing the memory contention bottleneck and reducing the memory required in the paging manager 15. Also, overhead for locking is reduced if the PCB lock 206 is obtained only after determining that a page control block 82 can be used.

In an alternative embodiment, a paging management system may include a dedicated collector thread 90 as described in conjunction with FIG. 2 and a plurality of user thread collectors 114a–c as described in conjunction with FIG. 5. The dedicated collector thread 90 maintains a free list of page buffers through a free list pointer 92 as described in conjunction with FIGS. 4A–4B.

If there are no page buffers 84 available on the free list (all the page buffers 84 are assigned to user threads 112a–c), the respective user thread collector 114a–c in the user thread 112a–c searches the page control blocks 82 in the cache 18 for a Least Recently Used ("LRU") page buffer 84 as described in conjunction with FIG. 6 to obtain a LRU page control block 82 from the PCB array in cache 18. Upon finding a LRU page buffer 84, the user thread collector 114a–c obtains the page buffer 84 for the user thread 112a–c.

In yet another embodiment in which both the dedicated collector thread 90 and user thread collectors 114a–c are provided, a method can be provided to select the dedicated collector or the user thread collectors 114a–c dependent on the environment in which the paging management system is operating. For example, the dedicated collector thread 90 can be selected for a single-process build environment and the user thread collectors 114a–c can be selected if there are a large number of concurrent user threads 112 executing.

It will be apparent to those of ordinary skill in the art that methods involved in the present system may be embodied in a computer program product that includes a computer usable medium. For example, such a computer usable medium can include a readable memory device, such as a solid state memory, hard drive device, a CD-ROM, a DVD-ROM or a computer diskette, having computer readable program code segments stored thereon. The computer readable medium can also include a communications or transmission medium, such as a bus or communications link, either wired, optical or wireless having program code segments carried thereon as digital or analog data signals.

While this invention has been particularly shown and described with references to particular embodiments thereof, it will be understood by those skilled in the art that various changes in form and details may be made therein without departing from the scope of the invention encompassed by the appended claims.

What is claimed is:

1. A method for managing a cache memory area comprising:
   storing data in a plurality of cache memory blocks, the cache memory blocks including a shared memory block, the data in the shared memory block being accessible by a plurality of data accessor tasks;
   triggering a collector to search the cache memory blocks for a collectable cache memory block; and
   from the collector, reclaiming the collectable cache memory block for use by the at least one data accessor task.

2. The method of claim 1 wherein the collector is a dedicated collector task, separate from the data accessor tasks, the collector task reclaims the collectable cache memory block to a list of free cache memory blocks.

3. The method of claim 1 further comprising:
   including the collector in at least one data accessor task;
   searching the shared cache memory by the collector in the at least one data accessor task for the collectable cache memory block; and
   collecting the collectable cache memory block by the collector for use by the at least one data accessor task.

4. In a computer, an apparatus for managing a cache memory area, comprising:
   a plurality of cache memory blocks for storing data, the cache memory blocks including a shared memory block, the data in the shared memory block being accessible by a plurality of data accessor tasks;
   means for triggering a collector to search the cache memory blocks for a collectable cache memory block; and
   from the collector, means for reclaiming the collectable cache memory block for use by the at least one data accessor task.

5. The apparatus of claim 1 wherein the collector is a dedicated collector task, separate from the data accessor tasks, the collector task reclaims the collectable cache memory block to a list of free cache memory blocks.

6. The apparatus of claim 1 further comprising:
   means for including the collector in the at least one data accessor task;
   means for searching the shared cache memory by the collector in the at least one data accessor task for the collectable cache memory block; and
   means for collecting the collectable cache memory block by the collector for use by the at least one data accessor task.

7. The apparatus as claimed in claim 6 wherein the means for searching comprises:
   means for randomly selecting an index to a block in the shared cache memory; and
   means for determining if the selected block is collectable.

8. The apparatus as claimed in claim 7 wherein the selected block is not collectable, the apparatus further comprising:
   upon determining that a previously selected block is not collectable, means for selecting a next index to a next block in the shared cache memory;
   means for determining if the selected next block is collectable; and
   means for repeating selecting and determining until a collectable next block is found.

9. The apparatus as claimed in claim 6 wherein the collector is a routine executed in the data accessor.

10. The apparatus as claimed in claim 8 wherein the next index is selected by incrementing the previously selected index.

11. The apparatus as claimed in claim 6 wherein the data accessor executes in a database management system.

12. The apparatus as claimed in claim 6 further comprising means for collecting the collectable block from a multidimensional database.

13. An article of manufacture comprising:
   a computer-readable medium for use in a computer having a memory;
   a computer-implementable program recorded on the medium to manage a cache memory having a plurality of cache memory blocks including a shared memory block, the program comprising instructions for:
      storing data in a plurality of cache memory blocks, the data in the shared memory block being accessible by a plurality of data accessor tasks;
      triggering a collector to search the cache memory blocks for a collectable cache memory block; and
      from the collector, reclaiming the collectable cache memory block for use by at least one data accessor task.

14. In a computer, a method of managing a cache memory area having a plurality of cache memory blocks, comprising:
   storing data in a first subset of cache memory blocks, the data being accessible by at least one data accessor;
   storing a list of free cache memory blocks in the computer, the free cache memory blocks being cache memory blocks that are not included in the first subset of cache memory blocks;
   generating a triggering event, based on the amount of free cache memory blocks;
   triggering a dedicated collector, separate from the data accessor to execute in the computer in response to the triggering event; and
   from the collector, reclaiming memory blocks from the first subset of cache memory blocks to the list of free cache memory blocks.

15. The method as claimed in claim 14 further comprising:
   satisfying a request for a cache memory block from a free cache memory block moved from the list of free cache memory blocks to the first subset of cache memory blocks.

16. The method as claimed in claim 14 wherein the first subset of cache memory blocks includes a shared memory block.

17. The method as claimed in claim 15 wherein the triggering event is triggered in response to satisfying the request for the cache memory block.

18. The method as claimed in claim 15 wherein the collector is triggered after satisfying the request for the cache memory block.

19. The method of claim 14 further comprising generating the triggering event based on a minimum threshold of a plurality of free cache memory blocks in the list of free cache memory blocks.

20. The method of claim 14 wherein reclaiming includes identifying a not recently used cache memory block.

21. The method of claim 14 wherein the triggering event is generated in response to an action by a data accessor task.

22. The method of claim 14 wherein the at least one data accessor and the collector are executed among a plurality of processing units in the computer.

23. The method of claim 14 further comprising suspending the execution of the collector in response to a maximum threshold of free cache memory blocks.

24. The method of claim 14 wherein reclaiming comprises communicating to an owner data accessor that an owned cache memory block is being reclaimed.

25. The method of claim 21 further comprising instructing, from the collector, the owner data accessor to write data out of the owned cache memory block.

26. The method of claim 14 wherein the at least one data accessor and the collector are processing threads in a multi-threaded computer system.

27. An apparatus for managing a cache memory area having a plurality of cache memory blocks in a computer, comprising:
   a first subset of cache memory blocks, the data in the shared memory block being accessible by at least one data accessor;
   a list of free cache memory blocks stored in the computer, the free cache memory blocks being cache memory blocks that are not included in the first subset of cache memory blocks;
   a triggering event generated based on the amount of free cache memory blocks; and
   a dedicated collector, separate from the data accessor tasks, executing in the computer, the collector reclaiming cache memory blocks from the first subset of cache memory blocks to the list of free cache memory blocks.

28. The apparatus of claim 27 further comprising:
   a request for a cache memory block satisfied from a free cache memory blocks to the first subset of cache memory blocks.

29. The apparatus of claim 27 wherein the first subset of cache memory blocks includes a shared memory block.

30. The apparatus of claim 27 wherein the triggering event is triggered in response to satisfying the request for the cache memory block.

31. The apparatus of claim 27 wherein the collector is triggered after satisfying the request for the cache memory block.

32. The apparatus of claim 27 wherein the triggering event comprises a minimum threshold of a plurality of free cache memory blocks in the list of free cache memory blocks.

33. The apparatus of claim 27 wherein the triggering event is generated from a data accessor task.

34. The apparatus of claim 27 wherein the collector reclaims cache memory blocks by identifying a not recently used cache memory block.

35. The apparatus of claim 27 further comprising a plurality of processing units in the computer to execute the at least one data accessor task and the collector task.

36. The apparatus of claim 27 further comprising a maximum threshold of free cache memory blocks to suspend the execution of the collector.

37. The apparatus of claim 27 further comprises comprising a message from the collector to an owner data accessor that an owned cache memory block is being reclaimed.

38. The apparatus of claim 34 further comprising an instruction from the collector to the owner data accessor to write data out of the owned cache memory block.

39. The apparatus of claim 27 wherein the at least one data accessor and the collector are processing threads in a multi-threaded computer system.

40. An article of manufacture comprising:
   a computer-readable medium for use in a computer having a memory;
   a computer-implementable program recorded on the medium to manage a cache memory having a plurality of cache memory blocks, the program comprising instructions for:
     storing data in a first subset of cache memory blocks, the data being accessible by at least one data accessor;
   storing a list of free cache memory blocks in the computer, the free cache memory blocks being cache memory blocks that are not included in the first subset of cache memory blocks;
   generating a triggering event in response to satisfying said request;
   triggering a dedicated collector, separate from the data accessor, to execute in the computer in response to the triggering event; and
   from the collector, reclaiming cache memory blocks from the first subset of cache memory blocks to the list of free cache memory blocks.

* * * * *